Sept. 10, 1946.   W. C. CARLTON   2,407,473
TIRE PRESERVER
Filed Oct. 13, 1944

Inventor
William Charles Carlton
By
John E Eastland
Attorney

Patented Sept. 10, 1946

2,407,473

UNITED STATES PATENT OFFICE 2,407,473

TIRE PRESERVER

William Charles Carlton, Ilford, England

Application October 13, 1944, Serial No. 558,511
In Great Britain December 11, 1943

1 Claim. (Cl. 280—150)

This invention relates to means or devices for protecting the tires of motor and other vehicles, including aircraft, more particularly motor road vehicles such as motor cars, lorries, motor buses and the like.

As is known, it is essential in order satisfactorily to maintain the tires of motor vehicles in good condition, periodically to examine the same and to extract therefrom any nails, flints, stones or other foreign bodies which may be adhering thereto or have become embedded therein.

The chief object of the present invention is to provide a simple and convenient form of device which will obviate or reduce the need for such inspections and which is adapted to protect the tires to the extent of providing a means for eliminating, removing or extracting therefrom as and when they are collected or picked up foreign bodies or objects such as nails, screws or flints.

In accordance with the invention, the wheel of the vehicle has mounted in a convenient position immediately adjacent the surface of the tire which it is desired to protect a guard, deflector, extractor, or the like adapted to be maintained at a predetermined distance from the tire and to protect the same from collecting, or to remove therefrom if and when collected, such foreign bodies as nails, screws, flints and the like.

The form of the guard, deflector, extractor or the like used will depend upon the construction of the vehicle to which it is to be applied and the form and dimensions of its wheels and tires.

In some instances, the guard, deflector, extractor or the like may be carried by means maintained at a predetermined distance from the tread by one or more wheels or rollers engaging with the tread surface whilst, in other instances, a fixed mounting may be employed.

Figure 1:
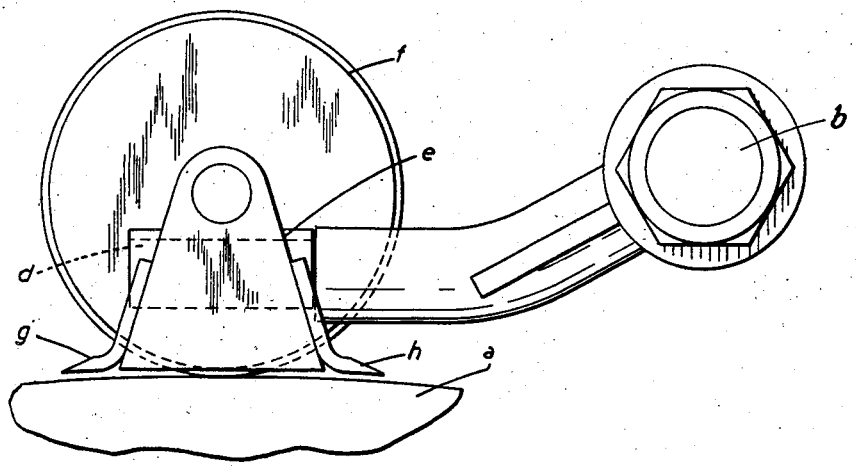
Figure 2:
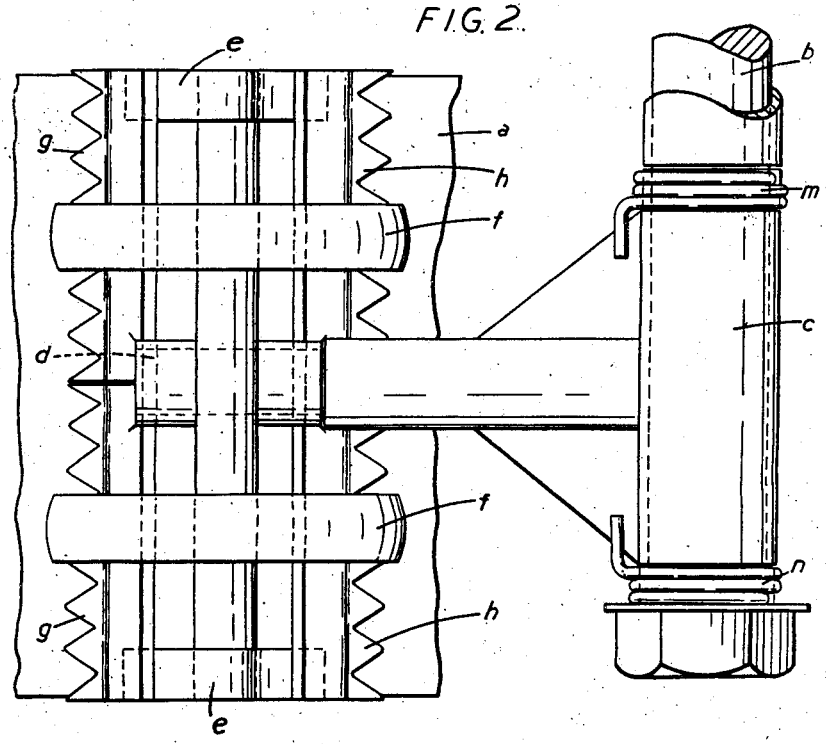

In order that the said invention may be clearly understood and readily carried into effect, the same will now be more fully described with reference to the accompanying drawing, in which:

Fig. 1 is a side view of one form of the device produced in accordance with the invention; and Fig. 2 is a plan view of the device shown in Fig. 1.

In the accompanying drawing, $a$ indicates a portion of the tread of a rubber tire of a motor or other road vehicle and $b$ indicates a spindle or bracket which is located adjacent the tread and which is utilised for the purpose of mounting or carrying the tire protecting device produced according to the invention. In the form of the invention illustrated, the device comprises a sleeve $c$ which is rockably mounted in position on the said spindle or bracket and is formed with a laterally projecting portion which extends towards the tread and terminates in a reduced part $d$ which is spaced from the tread so that it is parallel or substantially parallel with a line drawn tangentially to the tread surface. Also, on the aforesaid reduced part there is pivotally or rockably mounted a bracket $e$ in which there are rotatably mounted two wheels or rollers $f$ the peripheral surfaces of which are adapted to engage with the tread surface at points spaced laterally thereacross and disposed one at either side of the said spigoted part. The aforesaid bracket $e$ is adapted to serve as a mounting or carrier for the tire guards or deflecting or extracting elements of which, in the construction shown, there are four. That is to say, the forward side of the bracket $e$ has mounted thereon a pair of guards or the like $g$ and the rearward side of the bracket has mounted thereon a pair of similar guards or the like $h$. At their lower ends, that is to say, at their ends adjacent the tread surface, the guards are formed with outwardly projecting portions or feet which lie substantially parallel with the tread surface and are tapered or pointed as indicated in Fig. 1 and are, in addition, tooth-like or serrated in plan view as is indicated in Fig. 2.

It will be appreciated that the two guards at one side of the bracket are for use when the wheel is rotating in one direction and the other two guards are intended for use when the wheel is rotated in the opposite direction.

The aforesaid sleeve $c$ is biased or spring loaded as, for example, by a pair of springs $m$ and $n$ arranged one at each end of the sleeve so that one end of each spring is anchored and the other end thereof exerts pressure on the bracket extending outwardly from the sleeve. Thus, the wheels or rollers $f$ are urged against or yieldingly held in contact with the tread surface with the result that, notwithstanding the fact the tread surface may not be truly circular, the guards or the like will be maintained at a predetermined distance therefrom. In this connection, it will be appreciated that the degree of spacing between the under surfaces of the guards or the like and the tread surface is chosen with a view to ensuring that all foreign bodies (other than those of extremely small dimensions) picked up by the tread will be intercepted by the guards or the like and removed or thrown clear of the wheel before they can become firmly embedded in the tire.

In some instances, the guards or the like may be arranged so that they just touch that part of the peripheral surface of the tire which it is desired to protect.

I claim:

A device for protecting a tire mounted on a vehicle wheel comprising a rigid support mounted for rockable movement about an axis parallel with the axis of the wheel, a blade carried by said support and mounted for rockable movement about an axis at right angles to the axis of the wheel, and means on said support for normally maintaining the blade a predetermined distance from the tire so as to effect engagement of the blade with foreign particles picked up by the tire to remove such foreign particles.

WILLIAM CHARLES CARLTON.